United States Patent
Cowell et al.

(10) Patent No.: US 11,708,851 B2
(45) Date of Patent: Jul. 25, 2023

(54) DEVICE FOR CARRYING ARTICLES OF EQUIPMENT

(71) Applicant: TREEMAGINEERS LTD, Pitlochry (GB)

(72) Inventors: Christopher Cowell, Pitlochry (GB); Elliot Tanner, Montgomery (GB)

(73) Assignee: TREEMAGINEERS LTD., Pitlochry (GB)

( * ) Notice: Subject to any disclaimer, the term of this patent is extended or adjusted under 35 U.S.C. 154(b) by 51 days.

(21) Appl. No.: 17/433,043

(22) PCT Filed: Feb. 24, 2020

(86) PCT No.: PCT/GB2020/050425
§ 371 (c)(1),
(2) Date: Aug. 23, 2021

(87) PCT Pub. No.: WO2020/174221
PCT Pub. Date: Sep. 3, 2020

(65) Prior Publication Data
US 2022/0349439 A1    Nov. 3, 2022

(30) Foreign Application Priority Data
Feb. 26, 2019 (GB) ...................................... 1902583

(51) Int. Cl.
*F16B 45/02* (2006.01)
*A45F 5/02* (2006.01)
*A62B 35/00* (2006.01)

(52) U.S. Cl.
CPC ................ *F16B 45/02* (2013.01); *A45F 5/02* (2013.01); *A62B 35/0025* (2013.01)

(58) Field of Classification Search
CPC .......... F16B 45/02; F16B 45/023; A45F 5/02; Y10T 24/45335
See application file for complete search history.

(56) References Cited

U.S. PATENT DOCUMENTS

| | | | |
|---|---|---|---|
| 8,443,913 B2 * | 5/2013 | Nagasaka | B25F 5/02 173/171 |
| 10,077,867 B2 * | 9/2018 | Goetsch | F16M 11/041 |
| 2017/0231766 A1 | 8/2017 | Hariton et al. | |

FOREIGN PATENT DOCUMENTS

| | | |
|---|---|---|
| GB | 2530558 A | 3/2016 |
| JP | H04-79079 | 7/1992 |
| JP | 2009-196009 | 9/2009 |

OTHER PUBLICATIONS

International Search Report for PCT/GB2020/050425 dated Jun. 8, 2020, 4 pages.

(Continued)

*Primary Examiner* — Robert Sandy
(74) *Attorney, Agent, or Firm* — Nixon & Vanderhye

(57) ABSTRACT

A carabiner for carrying equipment is disclosed. The carabiner includes a hook assembly including a generally C-shaped body having an opening which is closed by an openable gate. It further includes a mounting assembly, which includes a mounting boss to which the body is releasably connected, and one or more fasteners to connect the mounting boss to a base component. The mounting boss may include a bore through which the body passes, the body being a close fit in the bore, such that the body can pivot respect to the boss about an axis of the bore. Control components may be provided that serve to resist movement of the body within the bore. The carabiner may be installed in a harness, by connecting the base to a component of the harness for example by passing a fastener through a hole in the component.

20 Claims, 8 Drawing Sheets

(56) References Cited

OTHER PUBLICATIONS

Written Opinion of the ISA for PCT/GB2020/050425 dated Jun. 8, 2020, 6 pages.
Teufelberger "treeMotion treeMotion S. light Herstellerinformation und Gebrauchsanleitung/Manufacturer's information and instructions for use", Apr. 30, 2018, XP055697158.
Teufelberger, "treeMotion treeMotion S. light Herstellerinformation und Gebrauchsanleitung/Manufacturer's information and instructions for use," Apr. 30, 2018, XP055697158, 148 pages.

* cited by examiner

DEVICE FOR CARRYING ARTICLES OF EQUIPMENT

CROSS-REFERENCE TO RELATED APPLICATIONS

This application is the U.S. national phase of International Application No. PCT/GB2020/050425 filed Feb. 24, 2020 which designated the U.S. and claims priority to GB Patent Application No. 1902583.2 filed Feb. 26, 2019, the entire contents of each of which are hereby incorporated by reference.

BACKGROUND OF THE INVENTION

Field of the Invention

This invention relates to a device for carrying articles of equipment. It has particular application to a device for carrying equipment on a harness intended for a person working at height.

Description of the Related Art

People working at height must often carry a large number of pieces of equipment such as hardware items (carabiners, ascenders, descenders, pulleys, etc.), ropes, slings, tools, etc., during the course of their work Typically, these are carried by connecting them temporarily to a work harness worn by the worker. It is essential for such equipment to be connected to the harness in a way that ensures they do not become accidentally detached, as this could cause loss of the equipment, damage to objects or injury to a person below. However, it is also essential that the equipment can be disconnected from the harness easily and conveniently when required for use.

Hitherto, it has been usual to provide sewn-in gear textile loops, metal or polymer hooks or small carabiners to retain equipment. It has also been known to provide carabiners that are specifically intended to connect to a fabric webbing of a harness to provide a location from which equipment can be suspended, an example being disclosed in GB-A-2 530 558.

These arrangements can lead to very little free space on the outside of a harness, resulting in cluttering and the possibility of pieces of equipment stacking on top of each other or becoming entangled. In addition, they are in generally fixed positions as they need to be either sewn to structural elements of the harness or fitted to predetermined but limited positions on the harness where structural webbing is visible and accessible.

The applicants have realised that many existing harnesses have spaced on their outer surfaces upon which equipment could potentially be carried, but no attachment means is present to enable this to happen.

Most harnesses consist of webbing and textile material to create the shape and structure for user retention within it Some harnesses have a semi-load-bearing component made from flexible plastic material through which holes are formed. These are generally used for load retention and webbing positioning during assembly of the harness. In a typical arrangement, the harness has multiple 5 mm holes scattered across the semi-load-bearing material spaced at 15 mm intervals to create small but strong mounting points. The applicants have realised that these holes, conventionally used only during assembly, can be brought into use while the complete harness is in service.

SUMMARY OF THE INVENTION

From a first aspect, this invention provides a carabiner for carrying equipment comprising:
 a. a hook assembly including a generally C-shaped body having an opening which is closed by an openable gate;
 b. a mounting assembly including a mounting boss to which the body is releasably connected, and one or more fasteners to connect the mounting boss to a base component.

The mounting boss typically includes a bore through which the body passes. The body is preferably a close fit in the bore, such that the body can pivot respect to the boss about an axis of the bore. The apparatus may include control components that serve to resist movement of the body within the bore. The control components may resist rotational and/or axial movement of the body within the bore. The control components may include one or more ring of elastomeric material carried, for example, on the body. Alternatively or additionally, the control components may include a fastener (or several fasteners) that can be secured to the boss or to the body in a position that the fastener prevents or resists rotational movement of the body within the bore. Preferably, the fastener may be secured to the boss or the body in a storage position in which it does not, or substantially does not resist or prevent rotational movement of the body within the bore.

One or more fastener may include a nut and a bolt in threaded interengagement, a shaft of the bolt passing through a hole in the boss and in the base component. One or more fastener may include a threaded screw retained in a hole within the base component. A reinforcement may be provided to spread load applied by the fastener and/or the boss to the base component.

From a second aspect, this invention provides a harness to which the mounting assembly of apparatus embodying the first aspect of the invention is connected.

In typical embodiments, the harness is a harness intended to support a person working at height or to provide fall protection.

In such embodiments, the base component may be constituted by a component of the harness. The or each fastener typically passes through a respective hole in the component of the harness. For example, the component may be a semi-load-bearing component. The component may have holes formed in it during manufacture of the harness.

In use, the harness may be in combination with including one or more pieces of equipment carried on the hook assembly of the carabiner.

BRIEF DESCRIPTION OF THE DRAWINGS

Embodiments of the invention will now be described in detail, by way of example, and with reference to the accompanying drawings, in which.

DESCRIPTION OF THE PREFERRED EMBODIMENTS

Figure 1:
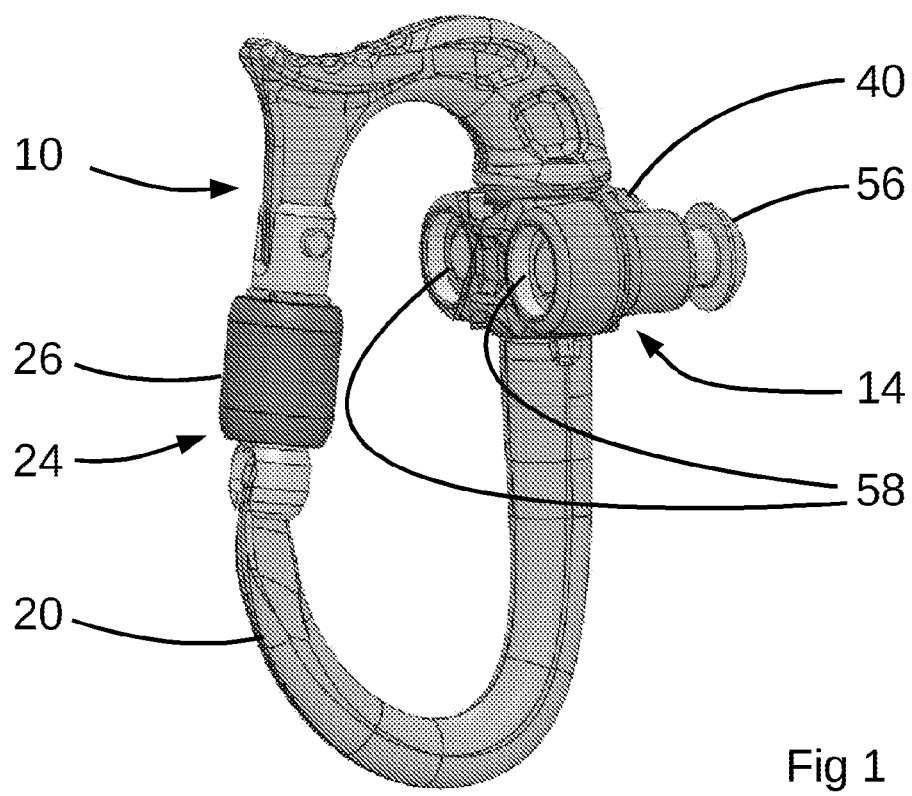
FIG. 1 shows a carabiner being a device for carrying articles of equipment embodying the invention.
Figure 2:
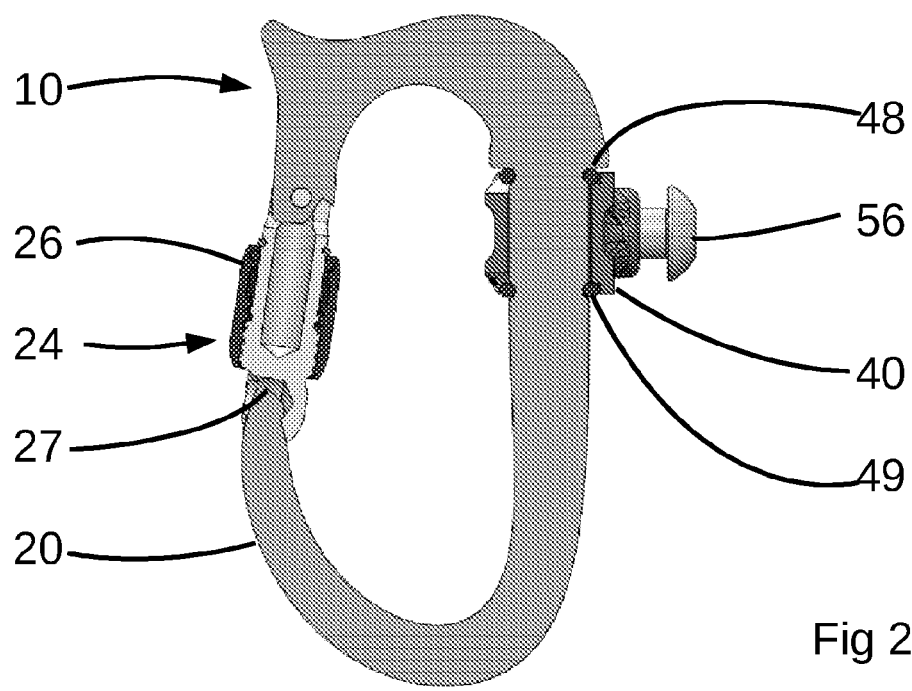
FIG. 2 is a cross-section of the carabiner of FIG. 1.
Figure 3:
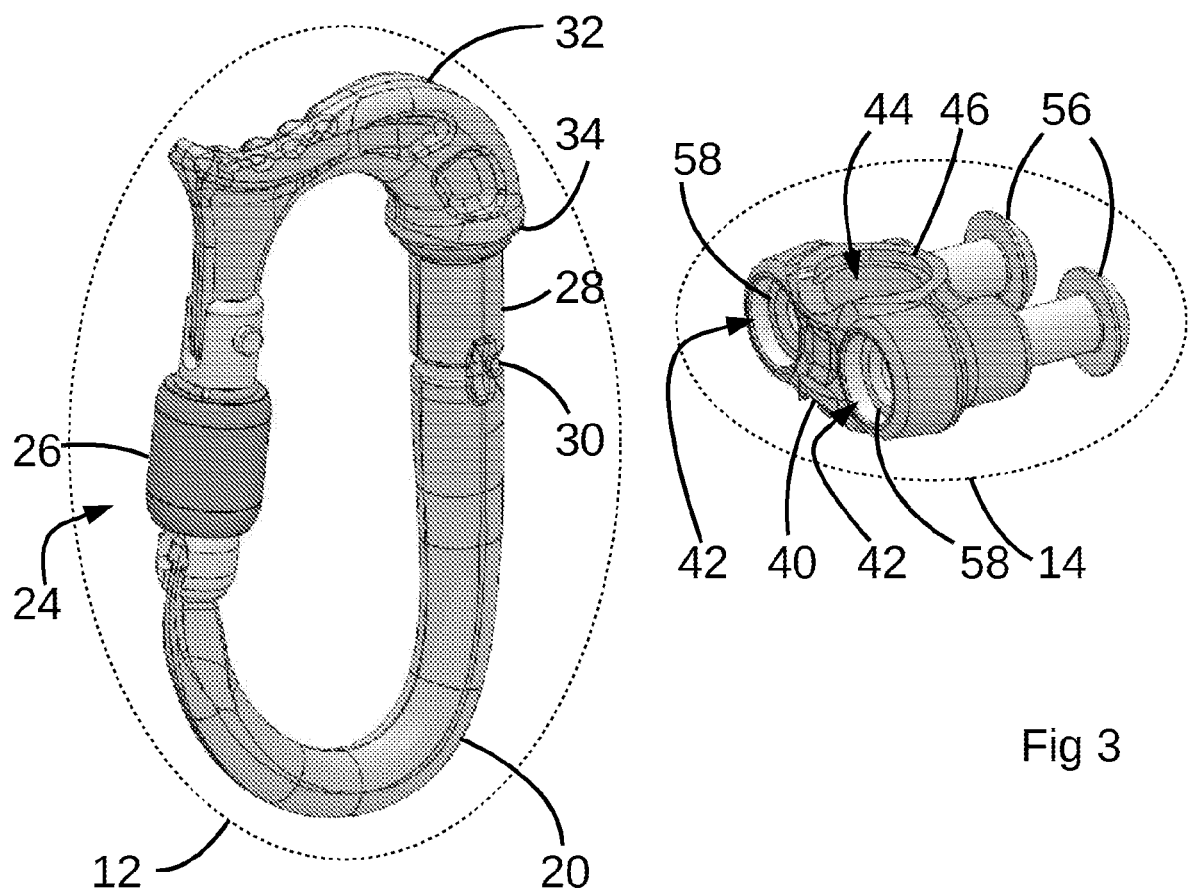
FIG. 3 shows the main subassemblies of the carabiner of FIG. 1.

With reference to the drawings, a device for carrying articles of equipment being a first embodiment of the invention takes the form of carabiner. The carabiner has two subassemblies: a hook assembly 12 and a mounting assembly 14.

The hook assembly 12 comprises a generally C-shaped body 20, the body 20 having first and second end portions between which is formed an opening 22. A gate 24 is carried on the body 20 at the first end portion, pivoted at one end portion such that it can move between a closed position (towards which it is biased by a spring), in which it closes the opening, such that the body 20 forms a complete loop, and an open position. In the open position, there is a gap between the gate and a nose 27 of the body 20 at the second end portion. The gate 24 includes a locking barrel 26 that can be used to secure the gate 24 in the closed position.

Opposite the gate 24, the body 20 has a straight back portion 28 which is cylindrical. A peripheral groove 30 is formed in the back portion 28. The body 20 has a top portion 32 between the back portion 28 and the opening 22, the top portion 32 having a cross section that is greater in size than the back portion 28. The body 20 has a frusto-conical portion 34 between the back portion 28 and the top portion.

The mounting assembly 14 comprises a boss 40. The boss 40 has two parallel bolt holes 42 of with axes 15 mm apart. At least an end portion 58 of each bolt hole 42 is of tapped. There may also be a remaining section that is circular and untapped. A bore 44 of circular cross-section extends through the boss 40 in a direction perpendicular to that of the bolt holes 42, the bore 44 having an axis that is equidistant from the axes of the bolt holes 42. The diameter of the bore 44 is slightly greater than the diameter of the back portion 28 of the body 20. The boss 40 has a flat mounting surface surrounding the openings of the bolt holes 42.

An upper opening of the bore 44 is formed with a step 46. An upper O-ring 48 surrounds the body 20 immediately adjacent to the frusto-conical portion 34 and makes contact with the step 46 of the boss 40. A lower O-ring 49 is located within the groove 30, the bore 44 being of such length that the groove 30 is immediately adjacent to it. The O-rings 48, 48 act as control components: the lower O-ring 49 resists axial movement of the body 20 within the bore 44, while the upper O-ring 48 resists rotational movement of the body 20 within the bore 44.

Figures 9A, 9B, 9C:
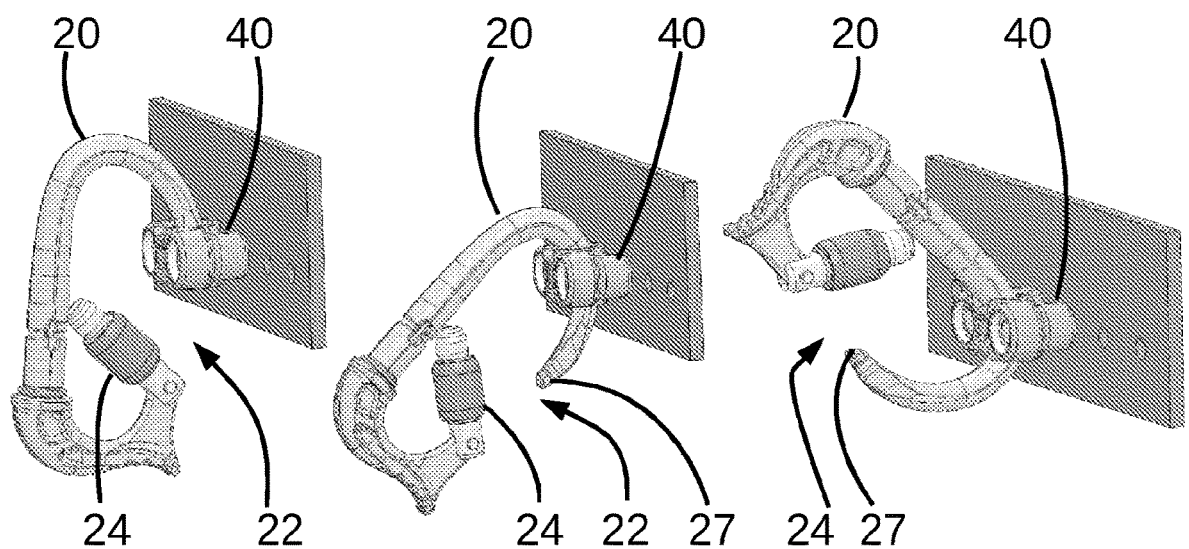
FIGS. 9a to 9c show a sequence for assembling the carabiner onto the base component of FIG. 8.
Figure 7:
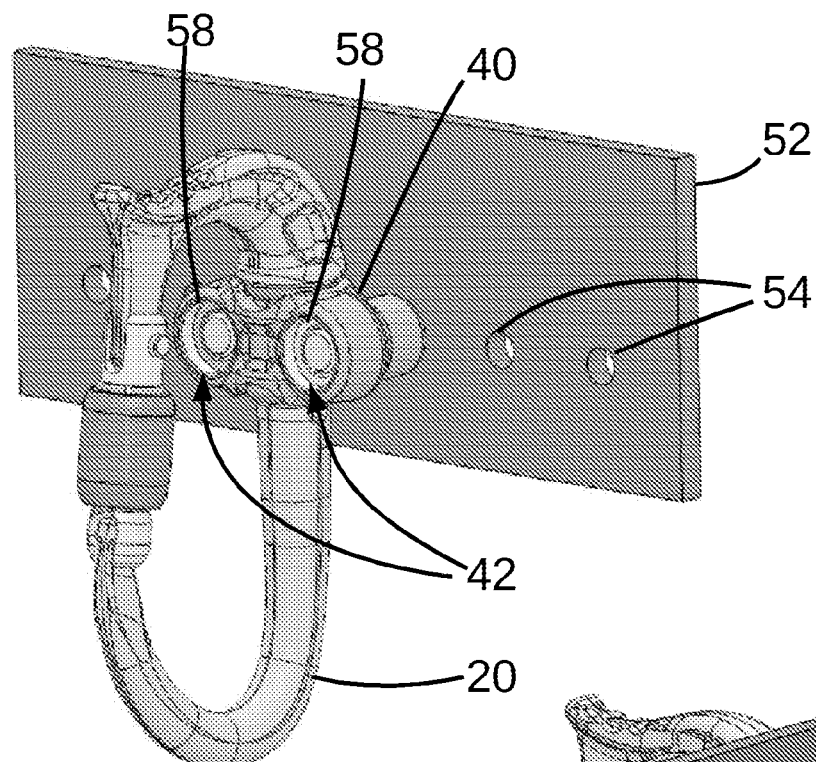
FIGS. 7 and 8 show in detail the carabiner of FIG. 1 mounted on a component of the harness of FIG. 4.
Figure 8:
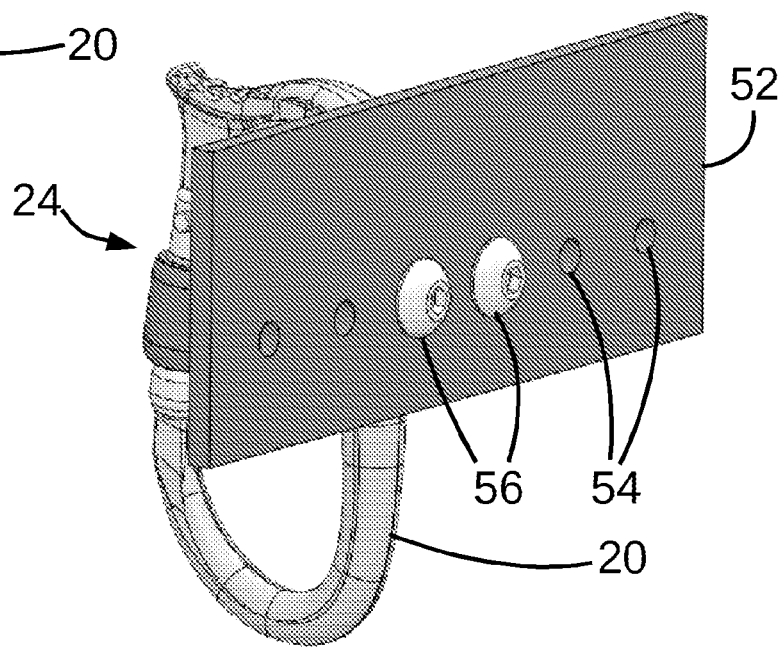
Figure 10:
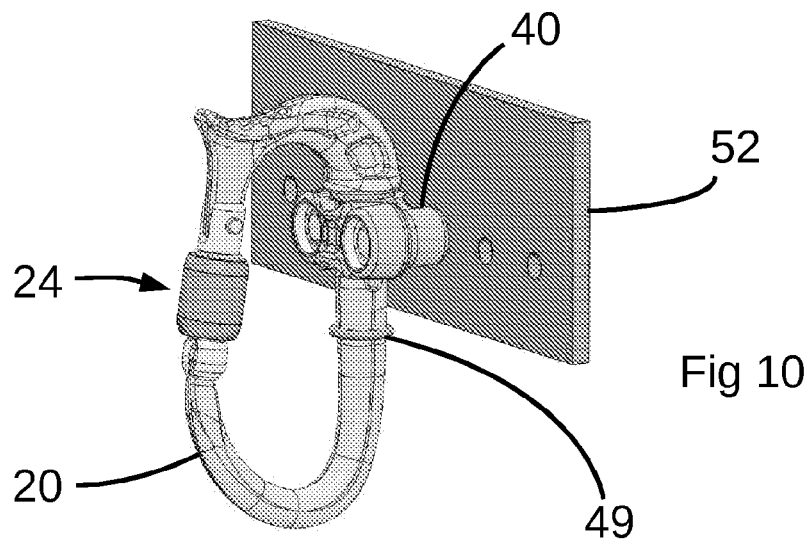
FIG. 10 shows the installation of an O-ring onto an assembled carabiner.

The body 20 and the boss 40 are shaped and dimensioned such that the carabiner can be assembled in accordance with the sequence shown in FIGS. 9a to 9c, in which the nose 27 of the body 20 is inserted into the bore 44, and the body is then passed through the bore until the upper O-ring 48 makes contact with the boss 40. As shown in FIG. 10, the lower O-ring 49 is then passed over the nose 27 along the body 20 of the carabiner until it is located in the groove 30. The O-rings 48, 49 are formed of an elastomeric material, and dimensioned to fit closely within the groove 30.

Figure 4:
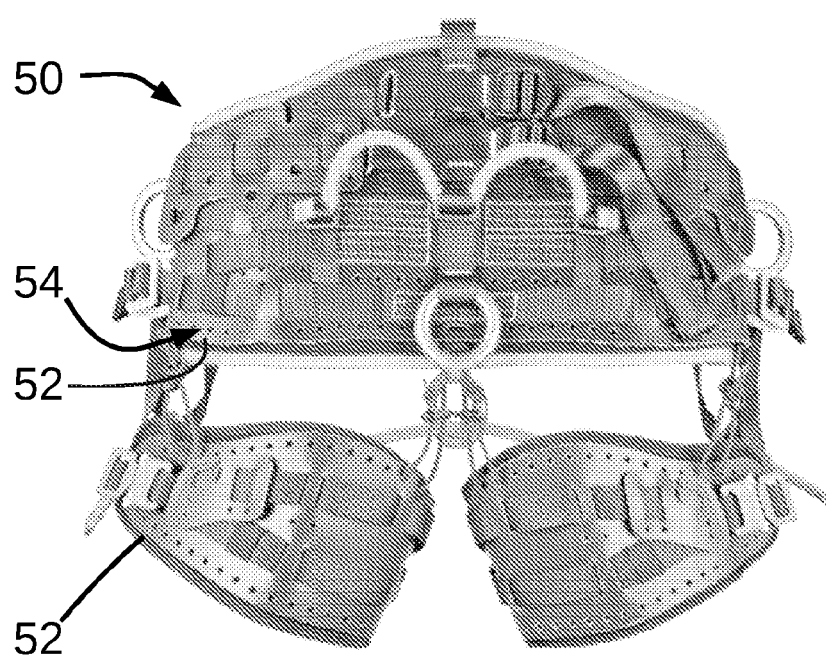
FIG. 4 shows a harness suitable for use with the carabiner of FIG. 1.
Figure 5:
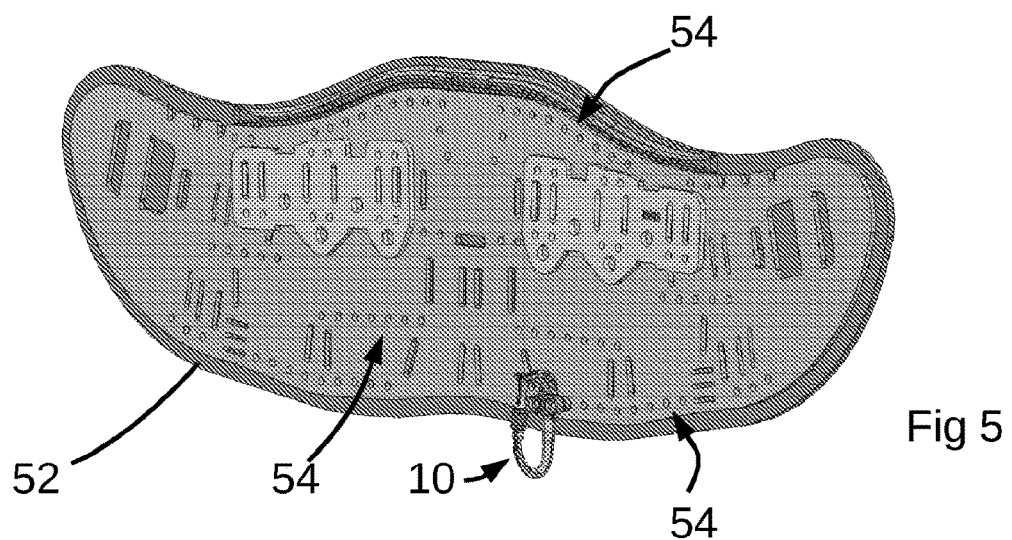
FIG. 5 shows a semi-load-bearing component of the harness of FIG. 4.
Figure 6:
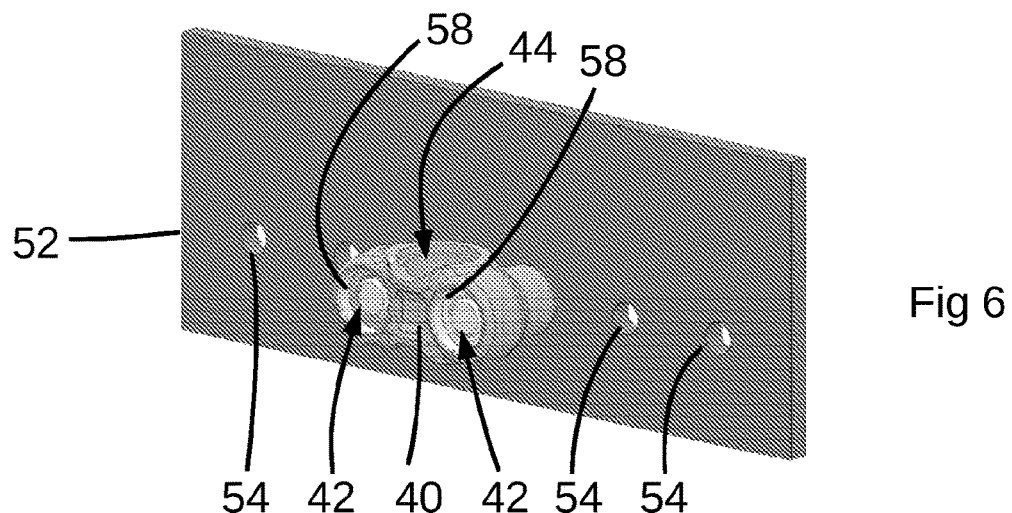
FIG. 6 shows a base component of the carabiner of FIG. 1 mounted on a component of the harness of FIG. 4.

FIG. 4 shows a harness 50 with which this carabiner can be used. It includes several semi-load-bearing components 52, including that shown in FIG. 5, that are formed with a large number of through holes 54, each 5 mm in diameter in this example and their centres are spaced apart 15 mm. Such components 52 may be made of a technical textile material through which such holes may readily be formed.

The carabiner 10 is mounted on the harness 50 by placing its flat mounting surface on a component 52 of the harness with its bolt holes 42 in alignment with respective through-holes 54 of the component 52. The shaft of a bolt 56 is then passed through each respective through-hole 54 into the bolt hole 42 of the boss 40. The bolt 56 is driven into threaded engagement with the threaded portion 58 of the bolt hole 42. The head of the bolt 56 makes contact with one surface of the component 52 pulling the flat mounting surface into contact with the other surface of the component 52. In this way, multiple carabiners can be secured to and removed from the harness 50 as required to meet a user's requirements for carrying equipment.

As an alternative, at least an end portion of each bolt hole 42 may be of hexagonal cross-section to receive a nut into which the bolt is driven.

Figure 15:
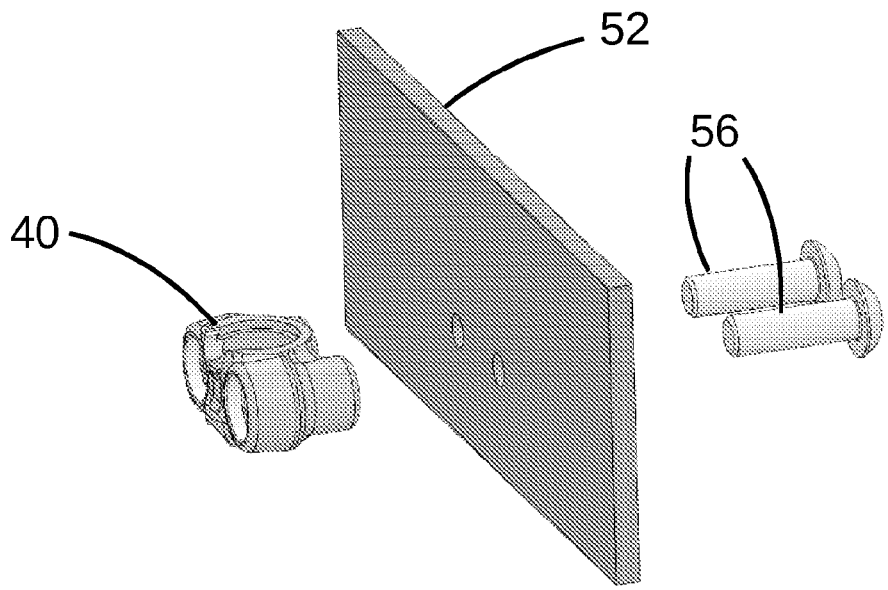
FIGS. 15 and 16 show alternative procedures for installing the carabiner of FIG. 1.
Figure 16:
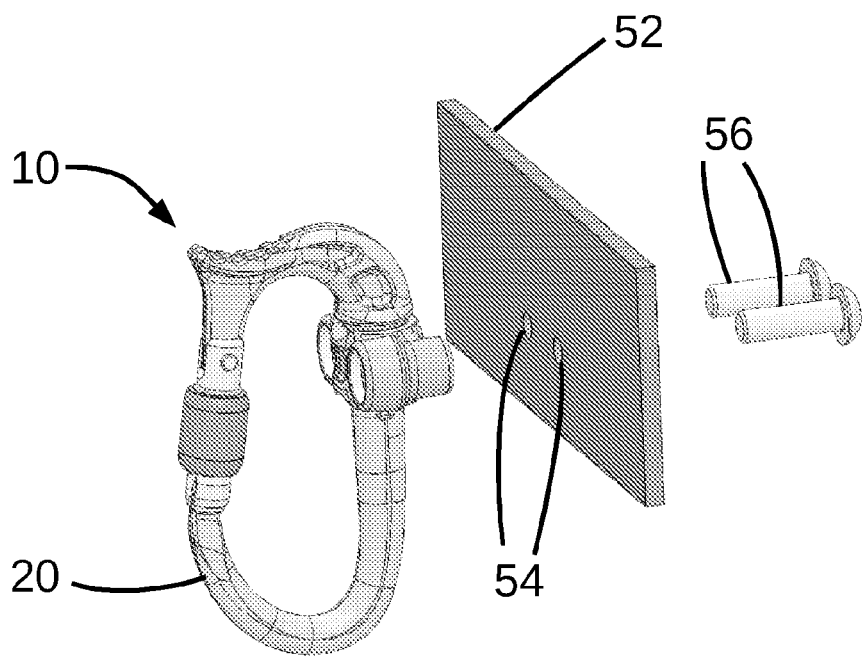

The mounting procedure described in the last-preceding paragraph can be performed before or after the carabiner is assembled as described above, meaning that either the boss 40 alone (FIG. 15) or the assembled carabiner (FIG. 16) is mounted onto the component 52.

For use, the carabiner 10 is configured such that the body 20 extends approximately perpendicularly from the component 52. An item of equipment can be carried on it by passing part of the component past the gate 24 through the opening 22. Once the gate 24 closes, the item is retained on the carabiner 10. The locking barrel 26 can then be used to secure the gate in the closed position so preventing removal of the item of equipment until the locking barrel is released.

Figure 11:
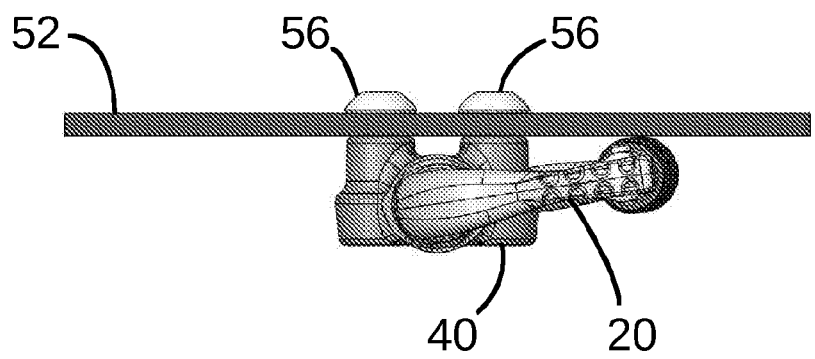
FIGS. 11 and 12 show the carabiner of FIG. 1 mounted on a component of the harness of FIG. 4 in a folded condition.
Figure 12:
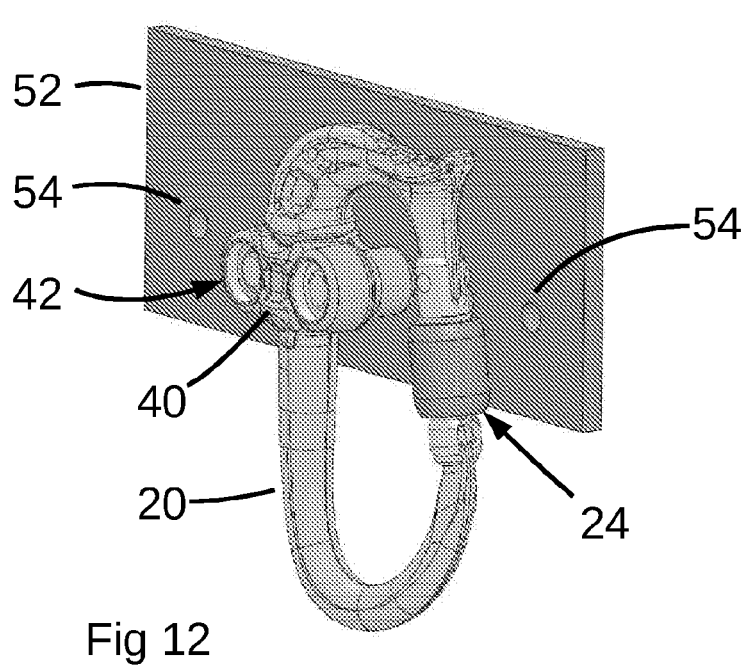

If a carabiner is temporarily not needed, it can be put into a stowed condition by pivoting the body 20 with respect to the boss 40 about the axis of the bore 44 until the body lies against the component 52 to which the carabiner is secured, as shown in FIGS. 11 and 12. The presence of the O-rings 48, 49 provide resistance to the pivoting movement thus ensuring that the body 20 tends to remain in the rotational position in which it is placed by a user.

Figures 13A, 13B, 13C:
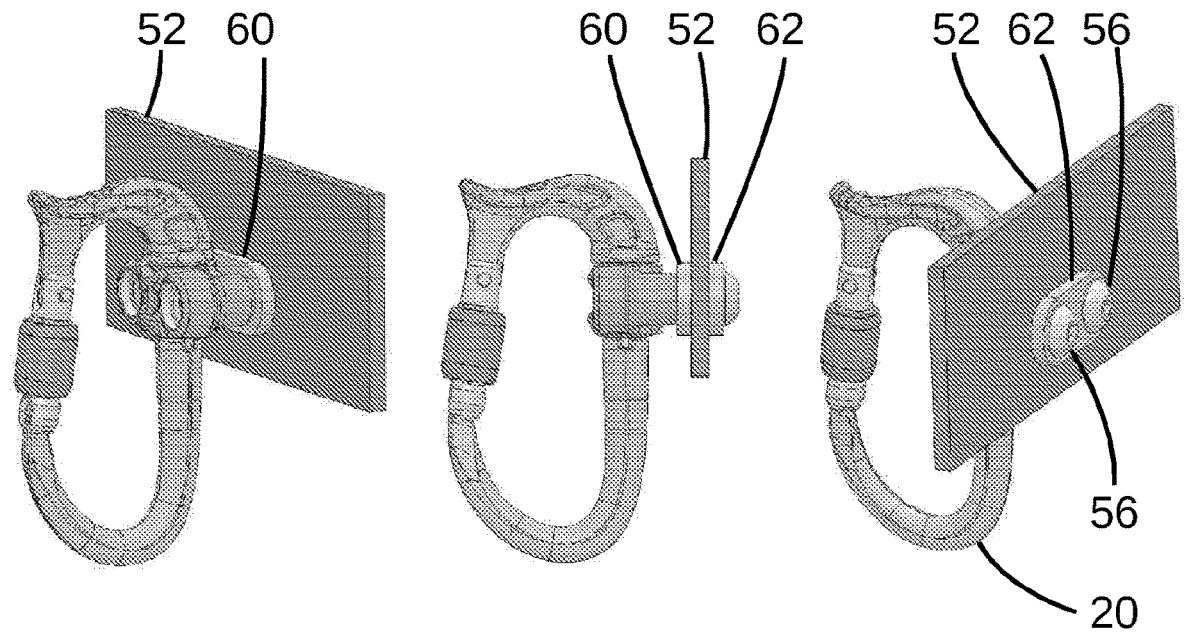
FIGS. 13a to 13c show an alternative arrangement by which the carabiner of FIG. 1 can be mounted on a component of a harness.

A variation on the arrangement for mounting the carabiner is shown in FIGS. 13a to 13c. In this arrangement, a first reinforcing plate 60 is positioned between the mounting surface and a first surface of the component 52 upon which the carabiner is to be mounted, and a second reinforcing plate 62 is placed between the head of the bolts 56 and the component 52 upon which the carabiner is to be mounted. Each reinforcing plate has two holes through which the shafts of the bolts 56 pass. The reinforcing plates 60, 62 serve to spread load on the component 52, which enables the carabiner to be used on components 52 that are formed from a wide range of materials.

Figure 14:
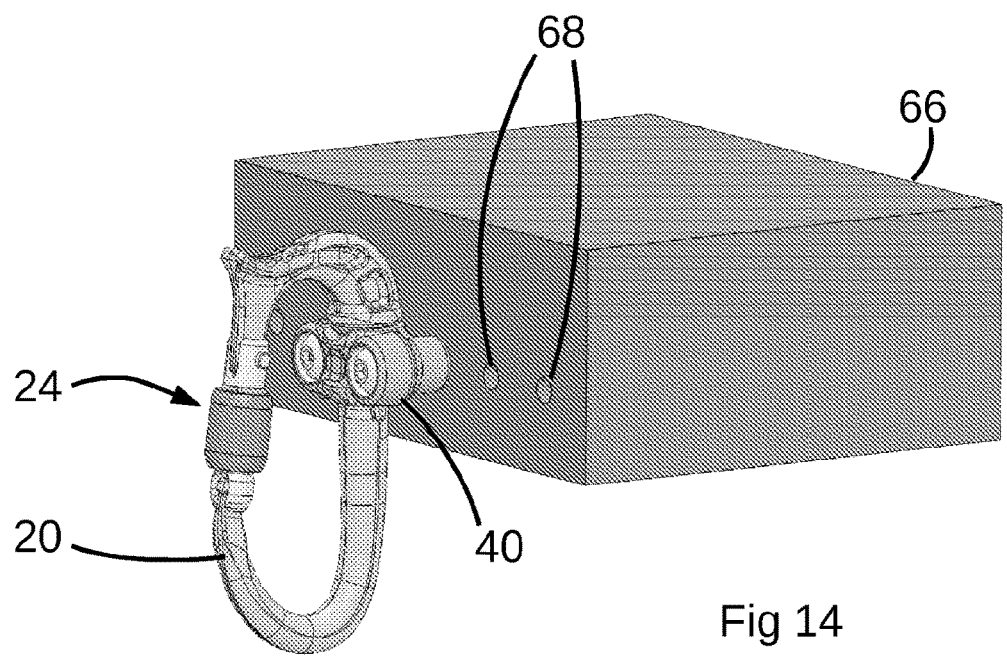
FIG. 14 show the carabiner of FIG. 1 mounted on a solid block component.

The boss 40 affords a multitude of attachment options. In the examples so far the boss 40 has been bolted from the rear through a component 52. The boss 40 could be bolted through the other direction the bolts 56 being in threaded engagement with the receiving material. FIG. 14 shows how a carabiner embodying the invention can be mounted to a fixed base 66, for example to hold tools in a workshop. The bolts 56 could be received in tapped holes in the fixed base, or self-tapping screws could be used in place of bolts.

Figure 17:
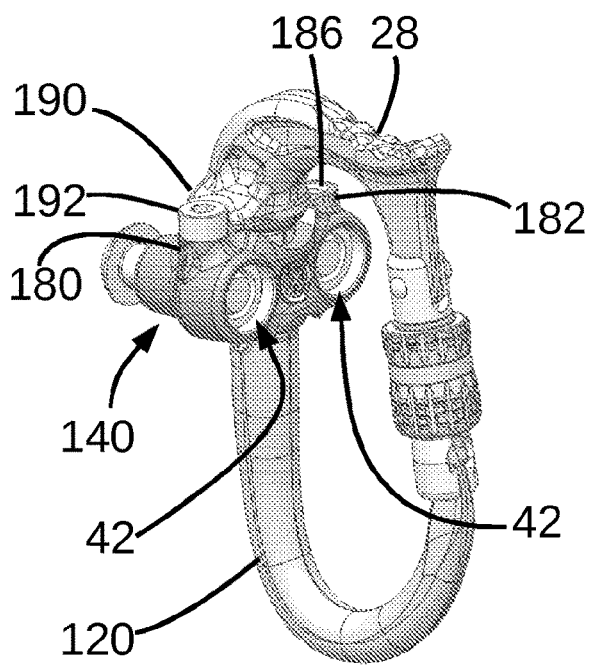
FIGS. 17, 18 and 19 show a second embodiment of the invention, being a variation to the carabiner of FIG. 1 in which the carabiner body can be selectively locked or unlocked.
Figure 18:
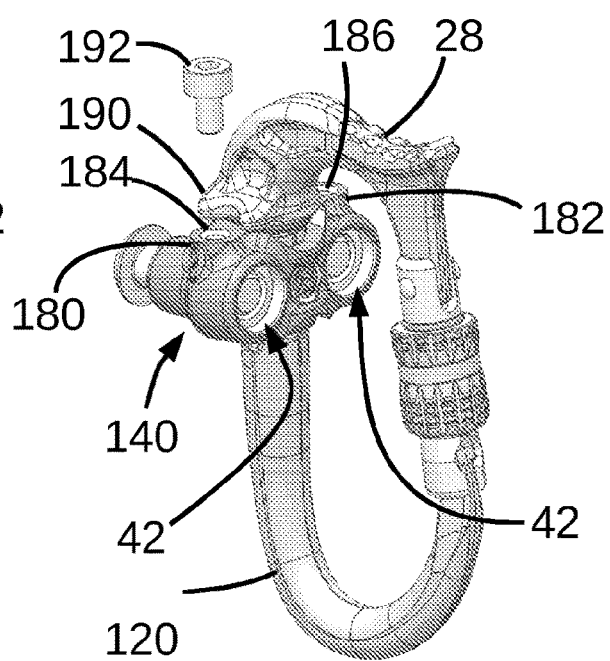
Figure 19:
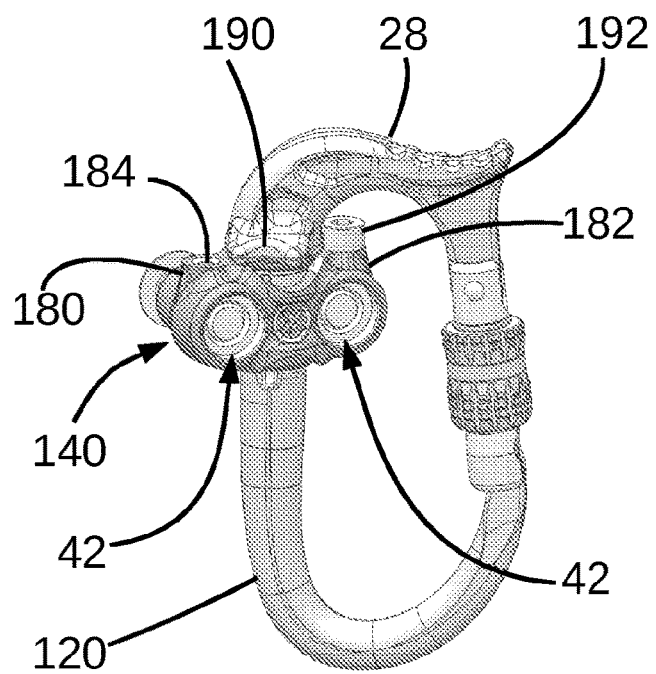

A second embodiment is shown in FIGS. 17 to 19. This embodiment has all the features of the first embodiment, and these will not be described again. The modifications in this embodiment are to the boss 140 and to part of the body 120.

In this embodiment, the boss 140 has first and second lugs 180, 182 disposed symmetrically and diametrically opposite one another with respect to the bore 44. A first and a second tapped hole 184, 186 is, respectively, formed in each of the two lugs 180, 182, the tapped holes 184, 186 having axes that are parallel to the bore 40 within which the body 120 is received and normal to the bolt holes 42.

A fork section 190 projects radially from the frusto-conical portion of the body 120. The fork section 190 has two projections that extend radially from the body 120 and which are interconnected by a concave recess. The projections extend in a direction that is generally perpendicular to the back portion 28 of the body 120.

A cap screw 192 is provided that has a shank carrying an external thread compatible with the thread tapped in the tapped holes 184, 186.

In a configuration shown in FIG. 17, the body 120 is rotated to project away from the surface of a component upon which the device is mounted. In this configuration, the projections of the fork section 190 diametrically opposed with respect to the first tapped hole 184. If the shank of the cap screw 192 is inserted into the first tapped hole 184 and screwed down, the head of the cap can be tightened into engagement with the first lug 180, closely adjacent to the concave recess of the fork section 190. The projections of the fork section 190 cannot pass the head of the cap screw 192, with the effect that rotation of the body 120 with respect to the boss 140 is prevented.

Once the cap screw 192 is removed from the first tapped hole 184, the body 120 can rotate on the boss 140 as described above in relation to the first embodiment. The cap screw 192 can be inserted into the second tapped hole 186 and tightened against the second lug 182, whereby the cap screw 192 can be stored while it is not being used to prevent pivoting of the body 120. This allows the body 120 to rotate on the boss 140, with, possibly, some restriction of movement when the fork section 190 contacts the head of the cap screw 192 towards one extreme of its range of movement.

It will be seen that the tapped holes 184, 186 open in a direction that faces approximately upwards in use. This allows a user of the harness to access the cap screw 192 while wearing the harness and also tends to ensure that gravity acts against loss of the cap screw 192 from the tapped holes 184, 186.

The invention claimed is:

1. A carabiner for carrying equipment comprising:
   a. a hook assembly including a generally C-shaped body having an opening which is closed by an openable gate;
   b. a mounting assembly including a mounting boss that includes a bore through which the body passes to which the body is releasably connected, and one or more mounting fasteners to connect the mounting boss to a base component, the body being a close fit in the bore, such that the body can pivot respect to the boss about an axis of the bore; and
   c. control components that serve to resist rotational movement of the body within the bore, wherein the control components include a control fastener that can be secured to the boss or to the body in a position that the control fastener prevents or resists rotational movement of the body within the bore.

2. The carabiner according to claim 1, wherein the control components resist axial movement of the body within the bore.

3. The carabiner according to claim 2, wherein the control fastener can be secured to the boss or the body in a storage position in which the control fastener does not resist or prevent rotational movement of the body within the bore.

4. The carabiner according to claim 2, wherein the one or more mounting fasteners includes a nut and a bolt in threaded interengagement, a shaft of the bolt passing through a hole in the boss and in the base component.

5. The carabiner according to claim 1, wherein in which the control components comprise one or more rings of elastomeric material carried on the body.

6. The carabiner according to claim 5, wherein the control fastener can be secured to the boss or the body in a storage position in which the control fastener does not resist or prevent rotational movement of the body within the bore.

7. The carabiner according to claim 5, wherein the one or more mounting fasteners includes a nut and a bolt in threaded interengagement, a shaft of the bolt passing through a hole in the boss and in the base component.

8. The carabiner according to claim 1, wherein the control fastener can be secured to the boss or the body in a storage position in which the control fastener does not resist or prevent rotational movement of the body within the bore.

9. The carabiner according to claim 8, wherein the one or more mounting fasteners includes a nut and a bolt in threaded interengagement, a shaft of the bolt passing through a hole in the boss and in the base component.

10. The carabiner according to claim 1, wherein the one or more mounting fasteners includes a nut and a bolt in threaded interengagement, a shaft of the bolt passing through a hole in the boss and in the base component.

11. The carabiner according to claim 1, wherein the one or more mounting fastener includes a threaded screw retained in a hole within the base component.

12. The carabiner according to claim 1, wherein the mounting assembly includes a reinforcement to spread load applied by one or both of the mounting fastener and the boss to the base component.

13. A harness to which the mounting assembly of the carabiner according to claim 1 is connected.

14. The harness according to claim 13, wherein the harness is suitable for supporting a person working at height.

15. The harness according to claim 13, wherein the harness is suitable for providing fall protection.

16. The harness according to claim 13, wherein the base component is constituted by a component of the harness.

17. The harness according to claim 13, wherein the mounting fastener or each of the mounting fasteners passes through a respective hole in e component of the harness.

18. The harness according to claim 13 in which a base component is a semi-load-bearing component.

19. The harness according to claim 13, wherein a base component includes holes formed during manufacture of the harness.

20. The harness according to claim 13 in combination with one or more pieces of equipment carried on the hook assembly of the carabiner.

\* \* \* \* \*